(12) United States Patent
Joshy

(10) Patent No.: US 11,164,247 B2
(45) Date of Patent: Nov. 2, 2021

(54) COMPUTER-IMPLEMENTED SYSTEMS CONFIGURED FOR PROVIDING REAL-TIME CREDIT OFFERS AND CREDIT NEGOTIATION FOR SPECIFIED TRANSACTIONS AND METHODS OF USE THEREOF

(71) Applicant: Capital One Services, LLC, McLean, VA (US)

(72) Inventor: Rendheer Joshy, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/789,972

(22) Filed: Feb. 13, 2020

(65) Prior Publication Data
US 2021/0256602 A1  Aug. 19, 2021

(51) Int. Cl.
G06Q 40/00 (2012.01)
G06Q 40/02 (2012.01)
G06Q 20/24 (2012.01)
G06Q 20/26 (2012.01)

(52) U.S. Cl.
CPC ......... G06Q 40/025 (2013.01); G06Q 20/24 (2013.01); G06Q 20/26 (2013.01)

(58) Field of Classification Search
USPC ............ 705/38, 39, 40, 41, 37, 26; 235/379
See application file for complete search history.

(56) References Cited

U.S. PATENT DOCUMENTS

| 5,974,146 | A | * | 10/1999 | Randle | G06Q 20/04 705/40 |
| 6,324,526 | B1 | * | 11/2001 | D'Agostino | G06Q 20/02 235/375 |
| 7,584,126 | B1 | * | 9/2009 | White | G06Q 20/10 705/35 |
| 7,689,502 | B2 | * | 3/2010 | Lilly | G06Q 20/105 705/38 |

(Continued)

OTHER PUBLICATIONS

A Practical Web-Based NSS Framework for E-Business Negotiation; Proceedings of the 38th Annual Hawaii International Conference on System Sciences (p. 36b); Wei Shang, Yijun Li, Wenjun Sun; Jan. 1, 2005. (Year: 2005).*

(Continued)

Primary Examiner — Tien C Nguyen
(74) Attorney, Agent, or Firm — Greenberg Traurig, LLP

(57) ABSTRACT

In some embodiments, the present disclosure provides an exemplary technically improved method for providing real-time alerts about an app user's location and the possibility that a user may be contemplating a credit offer from a merchant for a specific credit transaction with the merchant; alerting the user of the entity's willingness to extend credit for the specific credit transaction(s) with a merchant; negotiating with the user in real-time about the credit terms that the entity may be able to provide in comparison to offers received from existing merchants; and if approved, providing the user with the same or better credit terms than those offered by the merchant for that particular transaction(s); and avoiding any negative impact to the user's credit scores from a hard inquiry by either the merchant or the entity of the user's credit history with a credit bureau.

18 Claims, 4 Drawing Sheets

(56) References Cited

U.S. PATENT DOCUMENTS

| | | | | |
|---|---|---|---|---|
| 7,729,988 B1 * | 6/2010 | Walker | | G06Q 20/12 |
| | | | | 705/44 |
| 7,774,274 B2 * | 8/2010 | Jones | | G06Q 20/10 |
| | | | | 705/39 |
| 7,831,246 B1 * | 11/2010 | Smith | | H04W 4/24 |
| | | | | 455/420 |
| 7,991,694 B2 * | 8/2011 | Takayama | | G06Q 40/00 |
| | | | | 705/41 |
| 8,407,112 B2 * | 3/2013 | Walter | | G06Q 20/425 |
| | | | | 705/30 |
| 8,490,865 B2 * | 7/2013 | Randazza | | G06Q 20/02 |
| | | | | 235/379 |
| 8,600,871 B1 * | 12/2013 | Tavares | | G06Q 20/28 |
| | | | | 705/38 |
| 8,682,757 B2 * | 3/2014 | Menichilli | | G06Q 20/24 |
| | | | | 705/35 |
| 8,706,631 B2 * | 4/2014 | Gupta | | G06Q 30/0603 |
| | | | | 705/44 |
| 8,918,338 B1 * | 12/2014 | Bornhofen | | G06Q 20/355 |
| | | | | 705/38 |
| 9,047,617 B2 * | 6/2015 | Sanchez | | G06Q 20/02 |
| 9,934,537 B2 * | 4/2018 | Berland | | G06Q 30/0236 |
| 10,360,578 B2 * | 7/2019 | Basu | | G06Q 20/102 |
| 10,489,755 B2 * | 11/2019 | Tikku | | G06Q 20/027 |
| 2009/0138397 A1 * | 5/2009 | Sharma | | G06Q 20/102 |
| | | | | 705/40 |

OTHER PUBLICATIONS

Towards a Generic Payment Framework for Internet Media-on-Demand Services Based on RTSP; 22nd International Conference on Advanced Information Networking and Applications (aina 2008) (pp. 826-833); A. Ruiz-Martinez, J.A. Sanchez-Laguna, A.F. Gomez-Skarmeta; May 12, 2008.. (Year: 2008).*

* cited by examiner

COMPUTER-IMPLEMENTED SYSTEMS CONFIGURED FOR PROVIDING REAL-TIME CREDIT OFFERS AND CREDIT NEGOTIATION FOR SPECIFIED TRANSACTIONS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based methods for alerting app users about the availability of credit from entities in connection with specific transactions that the users may be contemplating; and providing improved computer-based methods of negotiating and approving matching or better credit terms with the entity than those offered by a competing merchant; all without a negative impact on the users' credit scores.

BACKGROUND OF TECHNOLOGY

A computer-based method according to the present disclosure may include the receipt of user location information by a group of processors (e.g., clients, servers) and other computing hardware devices that are linked together to facilitate communication between an entity and a user; and instantaneous communications via one or more specifically programmed graphical user interfaces on a mobile computing device associated with the user.

SUMMARY OF DESCRIBED SUBJECT MATTER

In some embodiments, the present disclosure provides an exemplary technically improved method comprising: receiving, by at least one processor associated with an entity, at least one first location alert when a user of a software application (app) running on a mobile computing device associated with the user, enters a store of a merchant with the mobile computing device associated with the user; where the at least one first location alert has been generated by a location tracking capability of the app running on the mobile computing device associated with the user; where the app is associated with the entity; where the at least one first location alert comprises a name and an address of the merchant; determining, by the at least one processor associated with the entity, whether the entity can offer credit to customers of the merchant and under what terms; receiving, by at least one processor associated with the entity, at least one first credit request from the mobile computing device associated with the user; where the at least one first credit request has been generated by the mobile computing device associated with the user when the user submits the at least one first credit request via a credit negotiation graphical user interface of the app; where the at least one first credit request comprises at least one merchant-specific credit term offered by the merchant for at least one purchase in the merchant's store, and a request for a counter-offer by the entity to the at least one merchant-specific credit term offered by the merchant; determining, by the at least one processor associated with the entity, the credit eligibility of the user and user-specific credit terms; instructing, by the at least one processor associated with the entity, the app to generate at least one first credit offer alert to be displayed by the mobile computing device associated with the user based on at least in part on the customer-specific credit terms; where the at least one credit offer alert is generated when the at least one merchant-specific credit term offered by the merchant for at least one purchase in the store of the merchant is above a predetermined threshold; where the at least one first credit offer alert comprises a notice to the user of the potential availability of the entity to provide credit to the user for at least one anticipated purchase in the store of the merchant without a credit check to at least one credit bureau; utilizing, by at least one processor associated with the entity, the credit negotiation graphical user interface of the app to: i) provide, to the user, at least one user-specific counter-offer to the at least one merchant-specific credit term offered by the merchant, and ii) conduct with the user a real-time credit negotiation regarding the at least one user-specific counter-offer; where the credit negotiation graphical user interface of the app comprises: i) at least one graphical user element that is configured to allow the user to approve or deny the at least one user-specific counter-offer of the entity and ii) at least one graphical user element to conduct the real-time credit negotiation; receiving, by at least one processor associated with the entity, from the mobile computing device associated with the user, the user's approval of the at least one user-specific counter-offer of the entity that avoids an electronic credit inquiry by the computer of the merchant to a computer of the at least one credit bureau that would affect to credit score of the user; and associating, by at least one processor associated with the entity, at least one purchase in the store of the merchant with the at least one user-specific counter-offer of the entity approved by the user.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
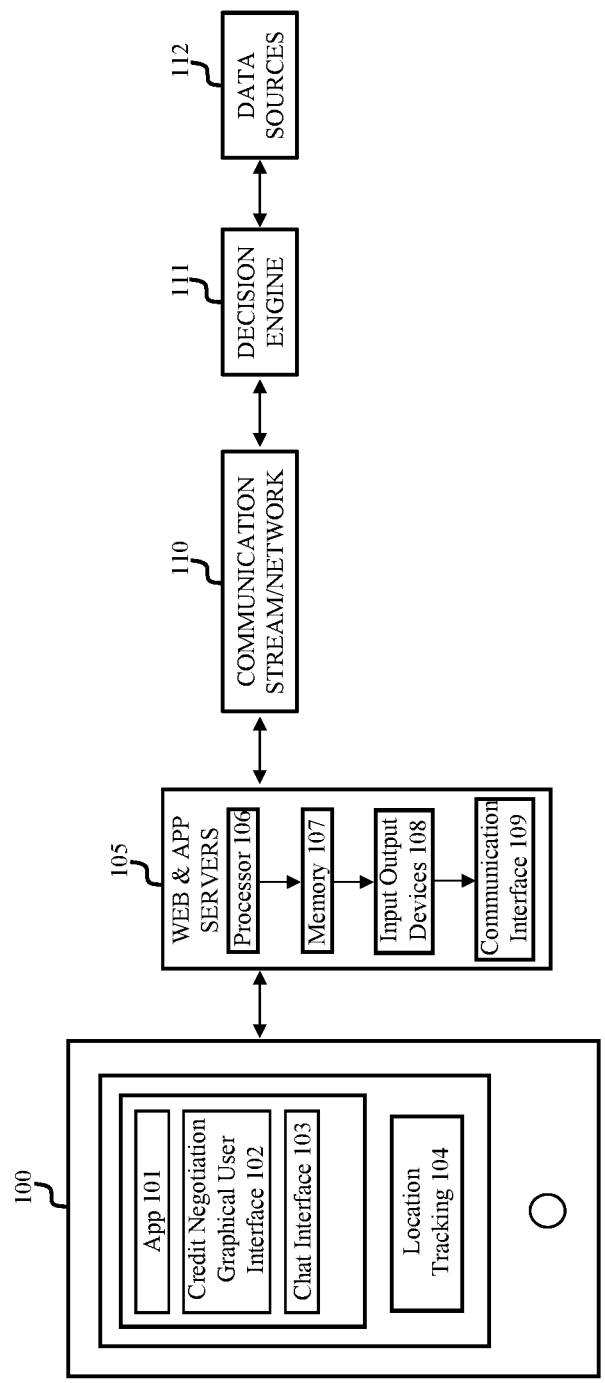
FIGS. 1-4 depict one or more schematics and flow diagrams that are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative.

Throughout the specification, the following terms take the meanings explicitly associated herein, unless the context clearly dictates otherwise. The phrases "in one embodiment"

and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a", "an", and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," pertains to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "user" shall have a meaning of at least one user respectively.

In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

As used herein, the term "mobile computing device" or the like, may refer to any portable electronic device that may include relevant software and hardware. For example, a "mobile computing device" can include, but is not limited to, any electronic computing device that is able to among other things receive and process alerts, credit offers, credit requests, and credit terms from a customer or entity including, but not limited to, a mobile phone, smart phone, or any other reasonable mobile electronic device that may or may not be enabled with a software application (App) from an entity.

In some embodiments, a "mobile computing device" may include computing devices that typically connect using a wireless communications medium such as cell phones, smart phones, tablets, laptops, computers, pagers, radio frequency (RF) devices, infrared (IR) devices, CBs, integrated devices combining one or more of the preceding devices, or virtually any mobile computing device that may use an application, software or functionality to receive and process alerts, credit offers, credit requests, and credit terms from a user or entity.

In accordance with one or more embodiments of the present disclosure, FIG. 1 illustrates an exemplary block diagram illustrating some features of the present disclosures. In FIG. 1, a user may communicate with an entity (e.g., a financial institution such as a bank or a credit union) in real time via mobile computing device 100. As shown in FIG. 1, a mobile computing device 100 associated with the user may communicate with Web and App Servers 105 which may communicate via communication channels/stream 110 with the entity's Decision Engine 111. The entity's Decision Engine 111 may further communicate with Data Sources 112.

In some embodiments, mobile computing device 100 may further be configured with a software application (App) 101 from an entity which further comprises a credit negotiation graphical user interface (GUI) 102 that may be configured to inter alia, allow a user to negotiate credit terms for specific transactions with the entity in real time.

In some embodiments, App 101 may further include a chat interface 103 on the credit negotiation graphical user interface (GUI) 102 that allows the user to chat with an agent of the entity in real-time during credit negotiation. App 101 may also include means for calling an agent of the entity from the mobile computing device associated with the user or for contacting the user on the mobile computing device associated with the user during the credit negotiation process and engaging in a conversation by phone with the agent during the credit negotiation process. The agent of the entity may be human or non-human including the use of artificial intelligence and/or chatbots.

In some embodiments, mobile computing device 100 may further be configured with an application, software or functionality 104 that may be capable of tracking and capturing the location of a user in real time including when a user enters particular merchant or retail stores.

In some embodiments, mobile computing device 100 may further include software or applications for processing, reading, storing, interpreting, and capturing images, pictures, augmented or virtual reality, or photographs of items or documents that are provided by the user and which reflect details about potential items the user is contemplating purchasing from a merchant including the price tag and description of the item and potential credit terms offered by the merchant. The credit terms offered by the merchant may include any discounts offered by the merchant, the interest rate and term of the offer, the number of incentives or points to be gained by the customer by accepting the credit terms offered by the merchant and any other details relating to the credit terms offered by the merchant.

A non-limiting example of a mobile computing device that may be used in accordance with this method may include an iPhoneX™ manufactured by Apple Inc., CA, or a Samsung Android smart phone manufactured by Samsung Electronics, NJ and configured to include relevant software and/or firmware.

As further shown in FIG. 1, in accordance with some embodiments of the present disclosure, Web and App Servers 105 may communicate via communication channels/network/stream 110 with an entity's Decision Engine 111. Web and App Servers 105 may include a processor 106, a memory 107, input/output devices 108, and communication circuitry and interface 109 for communication with the entity over a communication network 110. Processor 106 may be further configured to execute code for performing the tasks taught by the embodiments as described herein. In other embodiments, Web and App Servers 105 may include a cloud server implementing cloud computing services.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

Returning to FIG. 1, Decision Engine 111 may similarly include (not shown in FIG. 1) a processor, a memory, input/output devices, and communication circuitry and interface for communication with Web and App Servers 105 and for communication with Data Sources 112, for example. Data Sources 112 may also include (not shown in FIG. 1) a processor, a memory, input/output devices, and communication circuitry and interface for communication with Decision Engine 111 and Web and App Servers 105.

The processor of Decision Engine 111 and Data Sources 112 may be further configured to execute code for performing the tasks taught by the embodiments as described herein.

Figure 2:
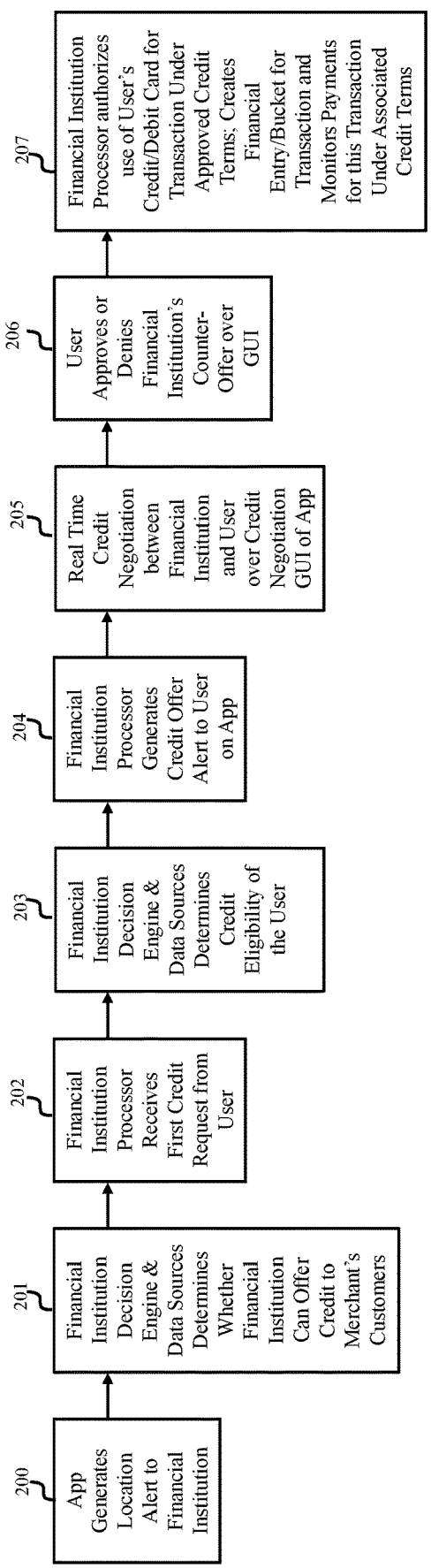

In accordance with one or more embodiments of the present disclosure, FIG. 2 illustrates an exemplary flow chart depicting a process illustrating some features of the present disclosures. For example, a user enters a merchant's store with a mobile computing device 100 associated with the user on which the entity's software application (App) 101 is running in the background. As shown in FIG. 2, in Step 200, App 101 is configured such that when the user enters a merchant's store with the mobile computing device 100 associated with user, App 101 generates a location alert to the entity.

The location alert generated at Step 200 by App 101 is generated with the assistance of location tracking capability feature 104 included in App 101 and which may be running on the mobile computing device 100 associated with the user. In order for the location tracking feature 104 to work on the mobile device 100 associated with the user, it is preferred to provide the user with an opt-in feature in which the user is able to consent to or decline tracking of their location by App 101. For example, the user may consent to tracking of their location by the location tracking capability feature 104 for a specific time period by providing an affirmative answer in response to an opt-in prompt when the customer installs App 101. Alternatively, the user may also opt-in or consent to tracking and generation of location and other alerts by App 101 in the "Terms and Conditions of Use" associated with App 101.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

When a user who has opted into location tracking enters a merchant's store with a mobile computing device associated with the user, the location alert generated by App 101 to the entity may comprise at least the name and address of the merchant and any other information that the entity may have configured the App to provide regarding the merchant. Such information may also include data relating to the merchant including whether or not the merchant is a customer of the entity; whether or not a pre-existing arrangement exists between the entity and the merchant regarding provision of credit to the merchant's customers; and whether the entity provides a credit service for the merchant. Such information may also include data relating to credit offers and terms previously provided by the merchant to its customers and shoppers.

In Step 201, after receiving the location alert from App 101, at least one processor associated with the entity communicates with Decision Engine 111 and Data Sources 112. The at least one processor may verify whether the entity is authorized to offer credit to that particular merchant's customers or whether the entity is prohibited from offering credit to that merchant's customers. For example, the entity may already have an existing arrangement with the merchant in which the entity provides credit to the merchant's customers. As another example, the entity may be providing and managing a store credit card program for the merchant. By querying the entity's Decision Engine 111 and Data Sources 112, the at least one processor may determine whether such an arrangement exists and confirm whether the entity is prohibited from offering, or authorized to offer, credit to that merchant's customers.

If prohibited from offering credit to that merchant's customers for any reason, no credit offer alert may be generated by the processor to the user.

If authorized to provide credit to the merchant's customers, the at least one processor may query Decision Engine 111 and Data Sources 112 to determine whether the entity provides credit services on behalf of the merchant, determine what those terms are, and direct the user to the credit terms and services provided by the entity on behalf of the merchant.

Alternatively, to the extent that the at least one processor determines that no existing arrangement exists between the entity and the merchant, or determines that the entity is free to offer new credit terms to customers of that particular merchant, a credit offer alert may be generated.

The system may be configured such that an existing arrangement between the entity and the merchant regarding credit terms to be offered by the entity to the merchant's customers may impact whether a credit offer alert is generated to a user and the terms of the credit offer that may be communicated to the user.

As illustrated in FIG. 2, in Step 202, at least one processor at the entity receives a first credit request from the user via App 101. The first credit request received from App 101 in Step 202 may include verifiable details regarding at least one item that the user seeks to purchase from the merchant including a description of the item and price and at least one specific credit term offered by the merchant to purchase the at least one item in the merchant's store. For example, the first credit request from the user may include a photograph of the item to be purchased and the interest rate and terms offered by the merchant. The first credit request may also include a request to obtain a counter-offer by the entity to the credit terms offered by the merchant. The first credit request may be received at the entity by a call or a voice-request from the user. The user's voice request may provide details of at least one merchant-specific credit term offered by the merchant, and at least one processor associated with the entity may analyze the user's voice request to generate a user-specific counter-offer. The user may also send the first credit request to the entity over email.

When the at least one processor determines in Step 201 that there is no pre-existing arrangement between the entity and the merchant to offer credit to customers, or determines that an offer may be communicated under the terms of an existing arrangement between the entity and the merchant, in Step 203, the at least one processor may communicate with Decision Engine 111 and Data Sources 112 regarding the user's history and profile with the entity and determine the user's eligibility for credit from the entity.

Step 203 may include a review of the user's profile by a human or a non-human agent (such as the use of artificial intelligence such as a chat bot) and a determination about whether to offer credit or not and under what terms. Determination of the user's credit eligibility to provide user-specific credit terms may comprise reviewing the user's prior existing records with the entity without a credit check to at least one credit bureau.

If it is determined in Step 203 that the user is not eligible for credit, no credit offer alert is generated by App 101.

If it is determined from Step 203 that the user is eligible for credit, and the amount and potential terms of any potential credit offer, including terms under an existing arrangement between the entity and the merchant, in Step 204, at least one processor associated with the entity may instruct App 101 to activate the credit negotiation GUI 102 of the App 101 and generate at least one first credit offer alert on the credit negotiation GUI 102 to the user in response to receiving a first credit request from the user.

The first credit offer alert may only be generated if the first credit request received from the user comprises at least one merchant-specific credit term offered by the merchant for at least one purchase in the merchant's store, and when the at least one merchant-specific credit term offered by the merchant for at least one purchase in the merchant's store is above a predetermined threshold. For example, the credit terms offered by the merchant may include discounts offered by the merchant above a predetermined rate by the entity; an interest rate and term of the offer above or below a predetermined threshold; a number of incentives or points to be gained by the user by accepting the credit terms offered by the merchant above or below a certain threshold; and any other thresholds determined by the entity and based on which a credit offer alert may or may not be triggered.

The first credit offer alert may include at least a notice of the entity's willingness to provide credit to the user for at least one anticipated purchase in the merchant's store without a credit check to at least one credit bureau.

In Step 205, in response to the first credit request from the user, at least one processor at the entity utilizes the credit negotiation graphical interface 102 of the App 101 to negotiate with the user in real-time dynamically, automatically, or with the help of human or non-human an agent and provide at least one specific counter-offer to the user that either matches or is better than the terms offered by the merchant for that transaction. The credit negotiation graphical interface 102 may for example, comprise the use of artificial intelligence such as a chat bot.

As described in Step 205 of FIG. 2 for example, (see also FIG. 3), the counter-offers provided by the entity may be provided based on existing history with the entity. This avoids a "hard inquiry" of the user's credit to credit bureaus such as Equifax, Experian, or TransUnion by either the entity or the merchant and thus avoids negatively impact the user's credit score.

In Step 206, at least one processor associated with the entity receives an approval or rejection from the user via credit negotiation GUI 102 of the counter-offer provided by the entity in Step 205. Credit negotiation GUI 102 is configured to allow the user to either approve or deny the at least one counter-offer provided by the entity in Step 206.

Credit negotiation GUI 102 is further configured to allow the user to select among several counter-offers provided by the entity with progressively better credit terms in which interest rate or term of the credit or some other financing term or parameter has been varied or to provide a counter to the counter-offer(s) provided by the entity. The iterative credit negotiation process can continue until either the entity or the user approves an offer or until an endpoint determined by the entity or the user has been reached.

As illustrated in FIG. 2, in Step 207, after receiving an approval or rejection of the entity's counter-offer by the user via credit negotiation GUI 102, at least one processor at the entity authorizes the provision of the approved credit terms to the user and authorizes the use of the user's card with the entity for that particular transaction. The user may hold a debit or credit or other card with the entity. The authorization notice generated by at least one processor associated with the entity, may for example, authorize the user to use their credit or debit card with the entity to complete at least one purchase in the merchant's store based on the approved counter-offer.

In Step 207, using at least one processor, the entity may optionally further create a specific financial entry for that particular transaction that associates that transaction with the specific credit terms approved for that transaction and may continue monitoring any payments by the user towards that specific transaction and associating those payments with that specific transaction in its financial records and statements.

Figure 3:
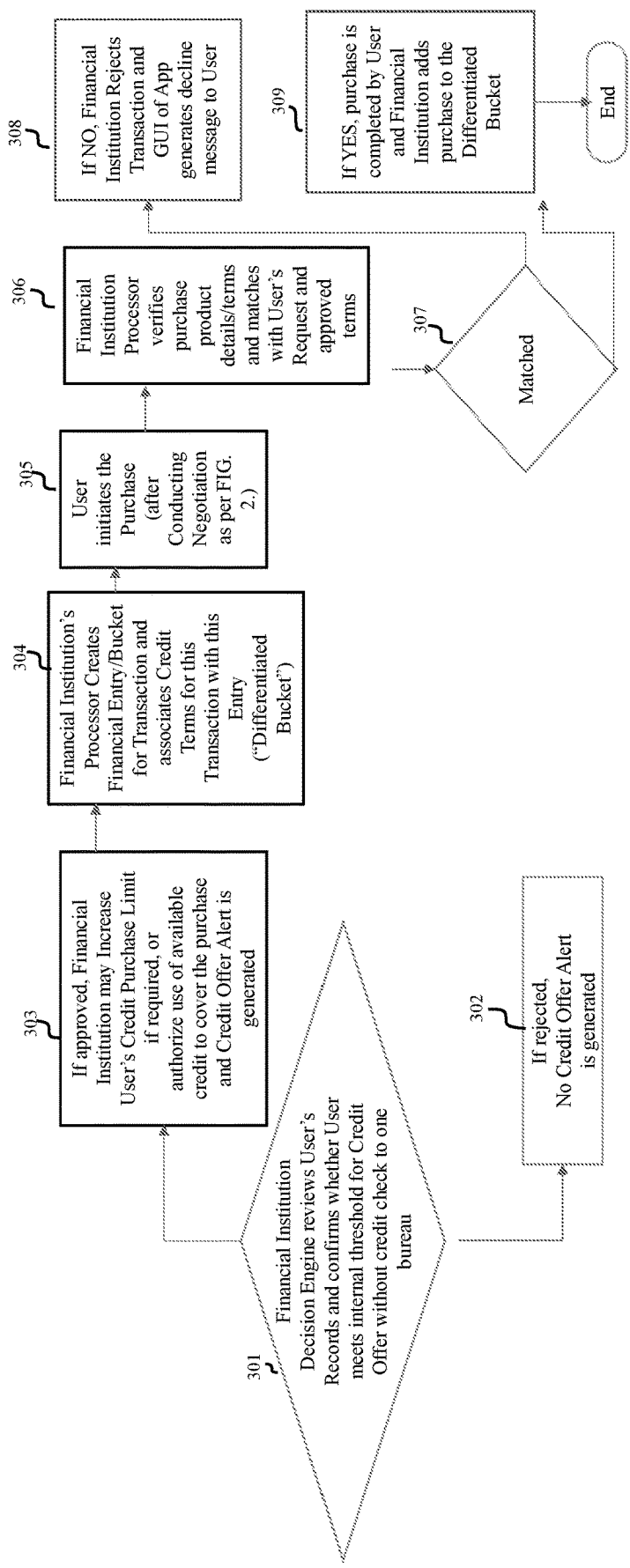

As further illustrated in FIG. 3, determination of the user's credit eligibility under user-specific credit terms (as for example, illustrated in Step 203 of FIG. 2) may further comprise determining whether the customer has a credit amount with the entity that exceeds a certain threshold. As shown in Steps 301, 302, and 303 of FIG. 3, a credit offer alert may only be generated if the user has a credit amount with the entity that is either below or above a certain threshold.

Determination of the user's credit eligibility under user-specific credit terms may also comprise determining whether the user has a credit limit with the entity that should be increased based on the user's existing records with the entity. The entity may approve an increase of the user's credit limit based on a positive review, by at least one processor associated with the entity of the user's existing records, and may instruct App 101 to generate at least one first credit offer alert to be displayed to the user only if the user's credit limit is increased. If the user's credit limit is not increased by the entity, no credit offer alert may be generated to the user.

As shown in Step 303 of FIG. 3, once a credit limit increase is approved by the entity or sufficient credit is determined to be available for a transaction, the entity may create a specific entry for this transaction and associate any user-specific credit terms with that entry.

In Step 304, the entity's processor may create a financial entry/bucket for this transaction and associate user-specific credit terms for this transaction thus differentiating this transaction from others.

In Step 305, once the user initiates the purchase, the entity may match the user's request and product details provided by the user with the credit terms approved for that transaction with the user-specific credit terms approved for that transaction as a verification step. As illustrated in Steps 306-307 and 309, the transaction is allowed to proceed only if there is a match. As shown in Step 308, Credit Negotiation GUI 102 may reject the transaction or may generate a "decline" or error message on App 102 or the user's mobile computing device 100 if there is not a match. The user may then edit any problematic details or terms that may be identified in the decline or error message, and resubmit for approval.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, App 101 or credit negotiation GUI 102 may include or may run one or more applications, such as Internet browsers, mobile applications, voice calls, videoconferencing, and email, among others. In some embodiments, App 101 or credit negotiation GUI 102 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like.

In some embodiments, App 101 or credit negotiation GUI 102 may be specifically programmed by either Java, .Net, QT, C, C++ and/or other suitable programming language. In some embodiments, App 101 or credit negotiation GUI 102 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, communications network/stream 110 may provide network access, data transport and/or other services to any computing device coupled to it. In some embodiments, communications network/stream 110 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary communications network/stream 110 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, exemplary communications network/stream 110 may include and implement, as an alternative or in conjunction with one or more of the above, a WiMAX architecture defined by the WiMAX forum. In some embodiments and, optionally, in combination of any embodiment described above or below, the exemplary communications network/stream 110 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary communications network/stream 300 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary communications network/stream 110 may also include mass storage, such as network attached storage (NAS), a storage area network (SAN), a content delivery network (CDN) or other forms of computer or machine-readable media.

In some embodiments, Web or App Servers 105 may be a web server (or a series of servers) running a network operating system, examples of which may include but are not limited to Microsoft Windows Server, Novell NetWare, or Linux. In some embodiments, the exemplary Web or App Servers 105 may be used for and/or provide cloud and/or network computing. In some embodiments, Web or App Servers 105 may have connections to external systems like email, SMS messaging, text messaging, ad content providers, etc. Any of the features of the exemplary Web server may be also implemented in the exemplary App server and vice versa.

In some embodiments, one or more of the exemplary Web or App Servers 105 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for customers.

In some embodiments and, optionally, in combination of any embodiment described above or below, the exemplary Web or App Servers 105 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

In some embodiments, exemplary inventive computer-based methods, systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

In some embodiments, exemplary inventive computer-based methods, systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based methods, systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based methods, systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

In some embodiments, the exemplary inventive computer-based methods, systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

Figure 4:
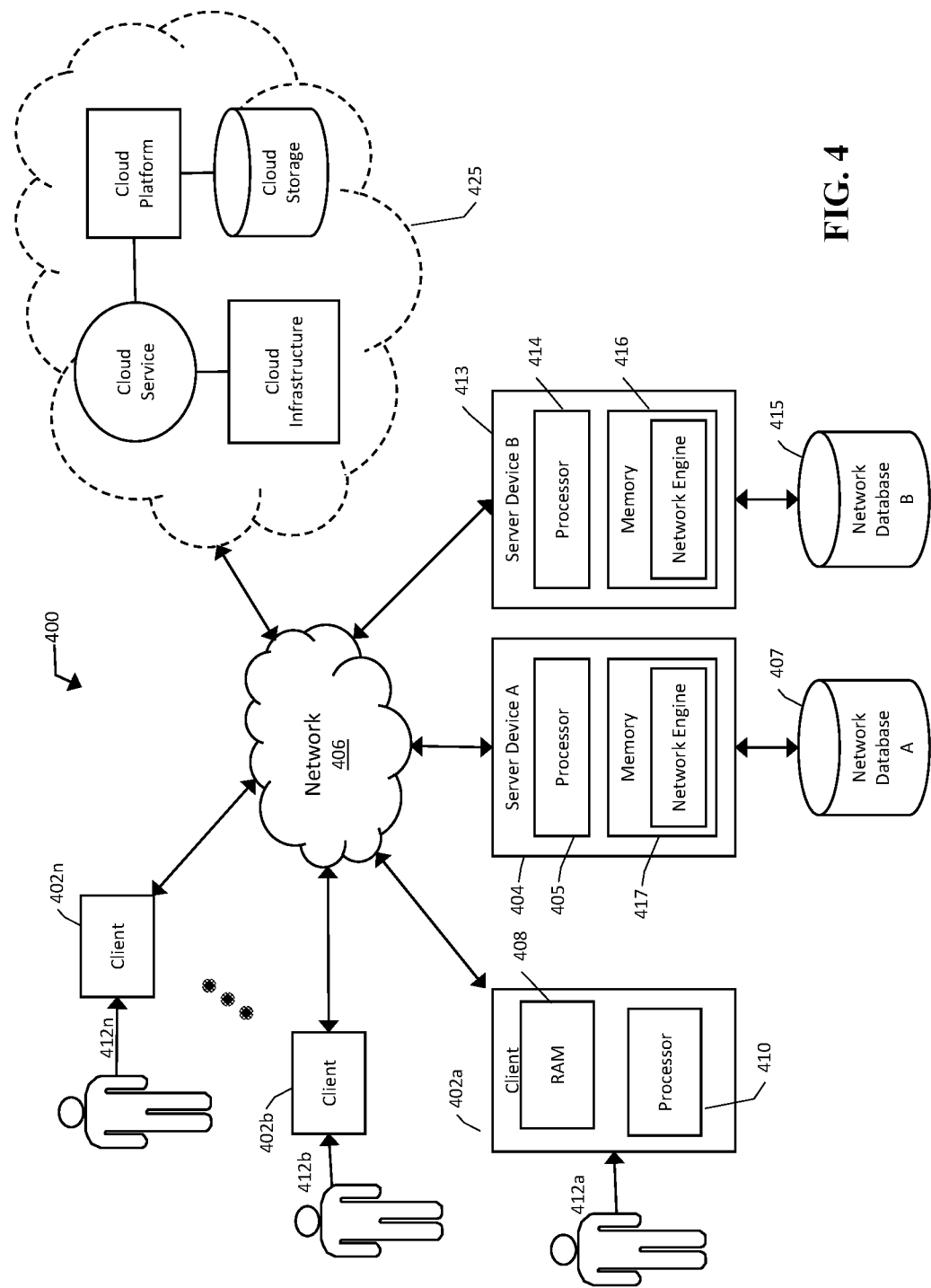

FIG. 4 depicts a block diagram of another exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member mobile computing devices 402*a*, 402*b* thru 402*n* shown each at least includes a computer-readable medium, such as a random-access memory (RAM) 208 coupled to a processor 410 or FLASH memory. In some embodiments, the processor 410 may execute computer-executable program instructions stored in memory 408. In some embodiments, the processor 410 may include a microprocessor, an ASIC, and/or a state machine. In some embodiments, the processor 410 may include, or may be in communication with, media, for example computer-readable media, which stores instructions that, when executed by the processor 410, may cause the processor 410 to perform one or more steps described herein. In some embodiments, examples of computer-readable media may include, but are not limited to, an electronic, optical, magnetic, or other storage or transmission device capable of providing a processor, such as the processor 410 of client 402*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 402*a-n* may also comprise a number of external or internal devices such as a mouse, a CD-ROM, DVD, a physical or virtual keyboard, a display, or other input or output devices. In some embodiments, examples of member computing devices 402*a-n* (e.g., clients) may be any type of processor-based platforms that are connected to a network 406 such as, without limitation, personal computers, digital assistants, personal digital assistants, smart phones, pagers, digital tablets, laptop computers, Internet appliances, and other processor-based devices. In some embodiments, member computing devices 402*a-n* may be specifically programmed with one or more application programs in accordance with one or more principles/methodologies detailed herein. In some embodiments, member computing devices 402*a-n* may operate on any operating system capable of supporting a browser or browser-enabled application, such as Microsoft™, Windows™, and/or Linux. In some embodiments, member computing devices 402*a-n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 402*a-n*, users, 412*a-n*, may communicate over the exemplary network 406 with each other and/or with other systems and/or devices coupled to the network 406. As shown in FIG. 4, exemplary server devices 404 and 413 may be also coupled to the network 406. In some embodiments, one or more member computing devices 402*a-n* may be mobile clients.

In some embodiments, at least one database of exemplary databases 407 and 415 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

The aforementioned examples are, of course, illustrative and not restrictive.

The advantages of the improved method disclosed herein over existing methods include the following: the ability to alert an entity when an app user or customer enters a retail environment; determine whether the customer is eligible for credit; and automatically or dynamically generate a credit offer alert to the customer. Further, the method provides an entity with the opportunity to compete for the customer's business for specific transactions that the customer is considering and which may have been lost to a merchant due to the merchant's provision of instantaneous credit terms for that specific transaction. The method also allows the customer to negotiate with its existing entity in real time and avoids a negative impact on the customer's credit score that may have occurred should the customer have proceeded with the merchant and the merchant conducted a hard inquiry on the customer's credit with a credit bureau.

At least some aspects of the present disclosure will now be described with reference to the following numbered clauses.

Clause 1: A method comprising:

receiving, by at least one processor associated with an entity, at least one first location alert when a user of a software application (app), running on a mobile computing device associated with the user, enters a store of a merchant with the mobile computing device associated with the user;

wherein the at least one first location alert has been generated by a location tracking capability of the app running on the mobile computing device associated with the user;

wherein the app is associated with the entity;

wherein the at least one first location alert comprises a name and an address of the merchant;

determining, by the at least one processor associated with the entity, whether the entity can offer credit to customers of the merchant and under what terms;

receiving, by at least one processor associated with the entity, at least one first credit request from the mobile computing device associated with the user;

wherein the at least one first credit request has been generated by the mobile computing device associated with the user when the user submits the at least one first credit request via a credit negotiation graphical user interface of the app;

wherein the at least one first credit request comprises at least one merchant-specific credit term offered by the merchant for at least one purchase in the merchant's store, and a request for a counter-offer by the entity to the at least one merchant-specific credit term offered by the merchant;

determining, by the at least one processor associated with the entity, the credit eligibility of the user and user-specific credit terms;

instructing, by the at least one processor associated with the entity, the app to generate at least one first credit offer alert to be displayed by the mobile computing device associated with the user based on at least in part on the customer-specific credit terms;

wherein the at least one credit offer alert is generated when the at least one merchant-specific credit term offered by the merchant for at least one purchase in the store of the merchant is above a predetermined threshold;

wherein the at least one first credit offer alert comprises a notice to the user of the potential availability of the entity to provide credit to the user for at least one anticipated purchase in the store of the merchant without a credit check to at least one credit bureau;

utilizing, by at least one processor associated with the entity, the credit negotiation graphical user interface of the app to:
  i) provide, to the user, at least one user-specific counter-offer to the at least one merchant-specific credit term offered by the merchant, and
  ii) conduct with the user a real-time credit negotiation regarding the at least one user-specific counter-offer;

wherein the credit negotiation graphical user interface of the app comprises:
  i) at least one graphical user element that is configured to allow the user to approve or deny the at least one user-specific counter-offer of the entity and
  ii) at least one graphical user element to conduct the real-time credit negotiation;

receiving, by at least one processor associated with the entity, from the mobile computing device associated with the user, the approval of the user of the at least one user-specific counter-offer of the entity that avoids an electronic credit inquiry by the computer of the merchant to a computer of the at least one credit bureau that would affect a credit score of the user; and associating, by at least one processor associated with the entity, at least one purchase in the store of the merchant with the at least one user-specific counter-offer of the entity approved by the user.

2. The method of clause 1, where the at least one first credit request comprises at least one merchant-specific credit term offered by the merchant for at least one purchase in the store of the merchant such as the amount of the at least one purchase.

3. The method of clause 1, where the at least one first credit request comprises at least one merchant-specific credit term offered by the merchant such as at least one detail about the item to be purchased.

4. The method of clause 1, where the at least one credit first request comprises at least one merchant-specific credit term offered by the merchant such as at least one financing term.

5. The method of clause 4, where the at least one first credit request comprises at least one financing term such as at least one interest rate.

6. The method of claim 1, wherein the at least one first credit request comprises an electronic photograph of the item to be purchased and at least one merchant-specific credit term that is analyzed by at least one processor associated with the entity to generate a user-specific counter-offer.

7. The method of claim 1, wherein the at least one first credit request comprises a voice request of the user providing details of at least one merchant-specific credit term offered by the merchant, and wherein the voice request of the user is analyzed by at least one processor associated with the entity to generate a user-specific counter-offer.

8. The method of clause 1, further comprising at least one user-specific counter-offer by the entity that is the same as the at least one merchant-specific credit term offered by the merchant.

9. The method of clause 1, further comprising at least one user-specific counter-offer by the entity that is better than the at least one merchant-specific credit term offered by the merchant.

10. The method of clause 1, where the at least one first credit request is received via the internet.

11. The method of clause 1, where the at least one first credit request is received via email.

12. The method of clause 1, where the user holds a credit card with the entity and receives an authorization notice, generated by at least one processor associated with the entity, to use the credit card to complete at least one purchase in the store of the merchant based on the at least one user-specific counter-offer of the entity approved by the customer.

13. The method of clause 1, where the user holds a debit card with the entity and receives an authorization notice, generated by at least one processor associated with the entity, to use the debit card to complete at least one purchase in the store of the merchant based on the at least one user-specific counter-offer of the entity approved by the user.

14. The method of clause 1, wherein, determining, by the at least one processor associated with the entity, the credit eligibility of the user and under user-specific credit terms; comprises determining whether the user has a credit amount with the entity that exceeds a certain threshold.

15. The method of clause 14, wherein the at least one first credit offer alert is only generated if the user has a credit amount with the entity that is below a certain threshold.

16. The method of clause 1, wherein, determining, by the at least one processor associated with the entity, the credit eligibility of the user and under user-specific credit terms; comprises reviewing the prior existing records of the user with the entity without a credit check to at least one credit bureau.

17. The method of clause 16, wherein, determining, by the at least one processor associated with the entity, the credit eligibility of the user and under user-specific credit terms; comprises determining whether the user has a credit limit with the entity that should be increased based on the existing records of the user with the entity.

18. The method of clause 17, wherein the entity approves an increase of the credit limit of the user based on a positive review, by at least one processor associated with the entity, of the existing records of the user, and instructs, by the at least one processor associated with the entity, the app to generate at least one first credit offer alert to be displayed by the mobile computing device associated with the user only if the credit limit of the user is increased.

19. The method of clause 18, wherein no credit offer alert is displayed by the mobile computing device associated with the user if the credit limit of the user is not increased by the entity.

20. The method of clause 1, wherein the at least one graphical user element used to conduct the real-time credit negotiation further comprises the use of artificial intelligence such as a chat bot.

Any publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:

communicating, by at least one processor associated with an entity, over a communication network, with a mobile computing device associated with a user, wherein the mobile computing device comprising an application (app) that is running in a background on the mobile computing device and configured to utilize a location tracking capability feature of the app to generate at least one location alert;

in response to determining that the app is turned off or is running on the mobile computing device, transmitting an activation control signal to the mobile computing device to cause the app to:
   i) automatically turn on an opt-in prompt, wherein the opt-in prompt comprising at least one first graphical user element, which is displayed on a screen of the mobile computing device that the user select to agree to a location tracking, and
   ii) enable, when the user select to agree to the location tracking, the location tracking capability feature of the app to obtain a location of the mobile computing device;

receiving, by the at least one processor associated with the entity, over the communication network, the at least one location alert from the app running on the mobile computing device associated with the user, the at least one location alert being automatically generated when the user enters a physical store of a merchant and after the location tracking capability feature of the app has been enabled;

wherein the at least one location alert comprises a location and an identifier of the merchant;

automatically determining, by the at least one processor associated with the entity, a credit eligibility of the user and at least one user-specific credit term based on the merchant identified in the at least one location alert;

automatically instructing, by the at least one processor associated with the entity, over the communication network, the mobile computing device to cause the app to generate at least one credit offer alert of a purchase at the physical store of the merchant based at least in part on the at least one user-specific credit term;

automatically instructing, by the at least one processor associated with the entity, over the communication network, the mobile computing device to cause the app to display the at least one credit offer alert on the screen of the mobile computing device associated with the user, the at least one first credit offer alert comprising a notice to the user that the at least one credit offer is provided without an electronic credit check inquiry against a credit history record of the user;

instructing, by the at least one processor associated with the entity, over the communication network, the mobile computing device to cause the app to display a credit negotiation graphical user interface of the app on the screen of the mobile computing device, wherein the credit negotiation graphical user interface of the app being programmed to display to the user to submit at least one first credit request;

wherein the at least one credit request comprises at least one merchant-specific credit term offered by the merchant for at least one purchase in the physical store of the merchant, and a request for a counter-offer by the entity to the at least one merchant-specific credit term offered by the merchant;

receiving, by the at least one processor associated with the entity, over the communication network, the at least one credit request from the mobile computing device associated with the user;

instructing, by the at least one processor associated with the entity, over the communication network, the mobile computing device to cause the credit negotiation graphical user interface of the app to:
   i) provide, to the user, at least one user-specific counter-offer to the at least one merchant-specific credit term offered by the merchant, and
   ii) conduct with the user a real-time credit negotiation regarding the at least one user-specific counter-offer;

wherein the credit negotiation graphical user interface of the app further comprises at least a second graphical user element, that is displayed on the screen to the user to approve or deny the at least one user-specific counter-offer of the entity;

receiving, by the at least one processor associated with the entity, from the mobile computing device associated with the user, a user approval of the at least one user-specific counter-offer;

receiving, by the at least one processor associated with the entity, from a computing device associated with the merchant, an indication of the purchase by the user at the physical store of the merchant; and automatically associating, by the at least one processor associated with the entity, the purchase at the physical store of the merchant with the at least one user-specific counter-offer approved by the user.

2. The method of claim 1, wherein the at least one first credit request comprises at least one merchant-specific credit term offered by the merchant for at least one purchase in the physical store of the merchant designating an amount of the at least one purchase.

3. The method of claim 1, wherein the at least one first credit request comprises at least one merchant-specific credit term offered by the merchant designating at least one detail about an item to be purchased.

4. The method of claim 1, wherein the at least one first credit request comprises at least one merchant-specific credit term offered by the merchant designating at least one financing term.

5. The method of claim 4, wherein the at least one first credit request comprises at least one financing term designating at least one interest rate.

6. The method of claim 1, wherein the at least one first credit request comprises an electronic photograph of an item to be purchased and at least one merchant-specific credit term that is analyzed by at least one processor associated with the entity to generate a user-specific counter-offer.

7. The method of claim 1, wherein the at least one first credit request comprises a voice request of the user providing details of at least one merchant-specific credit term offered by the merchant, and wherein the voice request of the user is analyzed by at least one processor associated with the entity to generate a user-specific counter-offer.

8. The method of claim 1, wherein the at least one user-specific counter-offer is identical to the at least one merchant-specific credit term offered by the merchant.

9. The method of claim 1, wherein the at least one user-specific counter-offer is better than the at least one merchant-specific credit term offered by the merchant.

10. The method of claim 1, wherein the at least one first credit request is received via the internet.

11. The method of claim 1, wherein the at least one first credit request is received via email.

12. The method of claim 1, wherein the user holds a credit card with the entity and receives an authorization notice, generated by at least one processor associated with the entity, to use the credit card to complete at least one purchase in the physical store of the merchant based on the at least one user-specific counter-offer approved by the user.

13. The method of claim 1, wherein the user holds a debit card with the entity and receives an authorization notice, generated by at least one processor associated with the entity, to use the debit card to complete at least one purchase in the physical store of the merchant based on the at least one user-specific counter-offer approved by the user.

14. The method of claim 1, wherein the determining, by the at least one processor associated with the entity, the credit eligibility of the user and under user-specific credit terms comprises determining when the user has a credit amount with the entity that exceeds a certain threshold.

15. The method of claim 14, wherein the at least one first credit offer alert is only generated when the user has a credit amount with the entity that is below a certain threshold.

16. The method of claim 1, wherein the determining, by the at least one processor associated with the entity, the credit eligibility of the user and under user-specific credit terms comprises reviewing existing records of the user with the entity without conducting the electronic credit check inquiry with at least one credit bureau.

17. The method of claim 16, wherein the determining, by the at least one processor associated with the entity, the credit eligibility of the user and under user-specific credit terms comprises determining when the user has a credit limit with the entity that should be increased based on the existing records of the user with the entity.

18. The method of claim 1, wherein the at least one second graphical user element used to conduct the real-time credit negotiation further comprises a chat bot.

* * * * *